(12) United States Patent
Holder et al.

(10) Patent No.: US 7,085,562 B1
(45) Date of Patent: Aug. 1, 2006

(54) METHOD, APPARATUS AND COMPUTER PROGRAM PRODUCT FOR IMPLEMENTING AND ORGANIZING AN AD-HOC AVIATION DATA COMMUNICATION NETWORK

(75) Inventors: Michael D. Holder, Redmond, WA (US); Willard R. True, Kirkland, WA (US)

(73) Assignee: Honeywell International Inc., Morristown, NJ (US)

( * ) Notice: Subject to any disclaimer, the term of this patent is extended or adjusted under 35 U.S.C. 154(b) by 959 days.

(21) Appl. No.: 09/863,098

(22) Filed: May 22, 2001

Related U.S. Application Data

(60) Provisional application No. 60/206,022, filed on May 22, 2000.

(51) Int. Cl.
*H04Q 7/20* (2006.01)

(52) U.S. Cl. .................. 455/431; 370/316; 370/254; 370/313

(58) Field of Classification Search ................ 370/389, 370/254, 313, 316, 325; 455/11.1, 431
See application file for complete search history.

(56) References Cited

U.S. PATENT DOCUMENTS

| | | | |
|---|---|---|---|
| 5,530,909 A | 6/1996 | Simon et al. | 455/11.1 |
| 6,018,659 A * | 1/2000 | Ayyagari et al. | 455/431 |
| 6,104,712 A * | 8/2000 | Robert et al. | 370/389 |
| 6,285,878 B1 * | 9/2001 | Lai | 455/431 |
| 6,445,308 B1 * | 9/2002 | Koike | 340/902 |
| 6,507,739 B1 * | 1/2003 | Gross et al. | 455/431 |
| 6,768,906 B1 * | 7/2004 | Matthews et al. | 455/431 |

FOREIGN PATENT DOCUMENTS

| | | |
|---|---|---|
| EP | 0 837 567 A | 4/1988 |
| EP | 1 017 188 A2 | 7/2000 |

OTHER PUBLICATIONS

Tanenbaum, A: "Computer Networks"; Prentice/Hall Int'l Inc, Englewood Cliffs NJ; XP002183847; 1981; p. 117, fig. 3.13.

\* cited by examiner

*Primary Examiner*—Doris H. To
*Assistant Examiner*—Steven Blount
(74) *Attorney, Agent, or Firm*—Black Lowe & Graham PLLC

(57) ABSTRACT

An airborne telecommunications network uses airborne aircraft to route message traffic between a source and destination.

6 Claims, 9 Drawing Sheets

METHOD, APPARATUS AND COMPUTER PROGRAM PRODUCT FOR IMPLEMENTING AND ORGANIZING AN AD-HOC AVIATION DATA COMMUNICATION NETWORK

CROSS-REFERENCES TO RELATED APPLICATIONS

This application claims priority from co-pending U.S. Application Ser. No. 60/206,022 titled: "Method For Implementing And Organizing An Ad-Hoc Aviation Data Communication Network," filed May 22, 2000, the entire contents of which are incorporated herein by reference.

BACKGROUND OF THE INVENTION

The present invention relates to telecommunications networks and in particular to a telecommunications network implementing over the horizon communications using the very high frequency (VHF) and/or the ultra high frequency (UHF) spectrum of the communications band.

Numerous telecommunications architectures exist or have been proposed for adding bandwidth and/or capacity to current communications systems. For example, fiber optic cable networks/ISDN telephone lines are the current state of the art in providing high capacity voice and data services using landlines. The advantages of this transmission medium are only available where a hardwired connection exists and a physical network has been installed. This restriction is true even for the lower bandwidth analog telephone and cable systems also in popular use. Therefore, a mechanism must exist between these subnetworks when a voice/data message transmits from a source network to a destination network not physically connected with each other.

In current applications, various mechanisms are used to link between the hardwired subnetworks that connect directly to the end user. Where line of sight communications are available, microwave towers and UHF repeaters are often used to relay transmission to a receiving antenna or other microwave routing facility. Optionally, the communication is routed to a satellite based communications network, to enable long distance, over the horizon communications.

Other telecommunications schemes are in use or have been suggested that use satellite communications to provide a direct connection between the end user and the system. Examples of such telecommunications architectures include the IRIDIUM communications system, the Globalstar communications system, and the Teledesic communications system. Each of these systems utilizes a constellation of satellites to route messages from the end user or source subnetwork to the destination. The IRIDIUM communication system, for example, consists of a constellation of low earth orbit satellites for providing voice message and telephone service anywhere on the globe. The Teledesic communications system is a proposed system that envisions a constellation of satellites to provide direct access to internet broadband services via an antenna located at the end user facility.

Each of the satellite based communications networks incur the enormous cost of launching, maintaining and managing a constellation of satellites. This fact makes use of such satellite based systems costly when compared to alternative land based systems. In particular, each of the IRIDIUM, Globalstar, as well as the proposed Teledesic systems have encountered financial difficulties do to the high cost of providing such services and the reluctance of customers to pay the associated fees.

Although rare, satellite systems are also subject to interference and disturbance due to solar activity. One such event known as a geosynchronous magnetopause crossing actually places the satellite outside the protection of the Earth's Van Allen belt. The Van Allen belt is a magnetic field that serves to deflect harmful charged particles emanating from the sun away from the Earth. When conditions temporarily place the satellite outside this belt, the satellite is subject to harm from these particles disrupting communications and potentially damaging the satellite.

Other than line of sight microwave repeaters and satellite networks, the only other viable solution for over the horizon communications when landline connections are not available is high frequency (HF) radio. Due to the physics of HF radio wave propagation, HF radio can be used to transmit messages over the horizon for great distances. Use of HF radio, however, has some serious limitations. First, the HF signal is extremely subject to atmospheric interference which makes the signal "noisy" and of relatively low bandwidth. Second, the exact propagation of the HF transmission is highly dependent on the current atmospheric conditions. An HF frequency that works on one day to transmit between point A to point B may not work at all on another day. During periods of extreme solar events, HF communications may not be available at high latitudes at all.

Aircraft are ideal examples of a communications user that relies on each of the telecommunications networks described above to effect communications. Aircraft often utilize VHF or UHF communications for line of sight voice communications with ground support facilities such as air traffic control and flight services. Aircraft also use VHF communications for voice and data messaging such as through the aircraft addressing and reporting system (ACARS), for intra-airline communications, datalink services and weather information uplinks.

VHF communications, however, are limited to line of sight. In the event line of sight communications cannot be established, the intended VHF communication cannot be completed. For this reason, many aircraft are equipped with additional communications systems such as HF and satellite communications systems (SATCOM). The inclusion of these additional systems to facilitate airborne communications increases aircraft operating costs since additional equipment must be purchased and maintained. Furthermore, such systems are frequently operated by proprietary vendors, such as ARINC, that charge access and user fees to handle communications traffic using such systems.

Various proposals have also existed for use of the cellular phone network aboard aircraft. Use of cellular phones is currently prohibited aboard aircraft because a large number of cells are visible to the airborne transmitter. A transmitted message from the airborne unit thus overloads the cellular network and disrupts cell phone operations for all users. One company, Aircell, has proposed a system whereby the transmitting power of the unit is modified by connecting the unit to an airborne interface. The interface moderates the output power of the cellular communications. However, use of this system additionally requires use of specialized additional equipment and associated cellular phone access fees. This system will also not work if the individual aircraft is not within line of sight of a cell.

BRIEF SUMMARY OF THE INVENTION

The present invention recognizes the problems of the prior art and provides an over the horizon VHF/UHF communications capability.

According to one aspect of the present invention, a communications network is established by utilizing airborne aircraft as wireless telecommunications network nodes. Communications transmitted from one source can be routed via the airborne aircraft to the destination. The number of aircraft typically airborne and their distribution along communications paths, provides connectivity between the source and destination communications centers.

According to another aspect of the present invention, the communications network of the present invention can be implemented to span the entire Earth without reliance on intermediate ground infrastructure. The present invention thus avoids the cost and overhead associated with ground stations while providing some of the advantages associated with use of a network of communications satellites. The present invention, however, avoids the cost of placing satellites on orbit as well as the cost of control centers to maintain operation of those satellites. The present invention is also not subject to the atmospheric and solar disturbances which can adversely affect the satellite and HF telecommunications systems.

According to still another aspect of the present invention, the present invention may be used as a data and voice network to route broadband signals such as those used in the internet and in cell phone networks without the cost, expense and risk of a satellite based network. The present invention thus additionally can provide accesses to such services in regions where a ground based infrastructure does not exist or is inadequate.

According to yet another aspect of the present invention, the present invention includes a packet routing processor and a digital radio transceiver. The digital radio transceiver aboard the aircraft receives packet data transmitted from another station and either retransmits that data and/or stores that data for use by a system or person aboard the aircraft.

Further features and advantages of the present invention will be apparent from the description below made with reference to the drawings.

DETAILED DESCRIPTION OF THE INVENTION

At any given time, a large number of aircraft are airborne over the continental United States. Similarly, a large number of aircraft are airborne over the other major land masses of the globe. While oceanic routes are less populated, certain routes, such as the North Atlantic Track System, for example, are densely populated with aircraft slotted 10 minutes in trail behind each other on predefined courses. The present invention recognizes and makes use of this condition to develop an ad-hoc communications network wherein the airborne aircraft form communications nodes in the network for routing messages to a destination.

Figure 1:
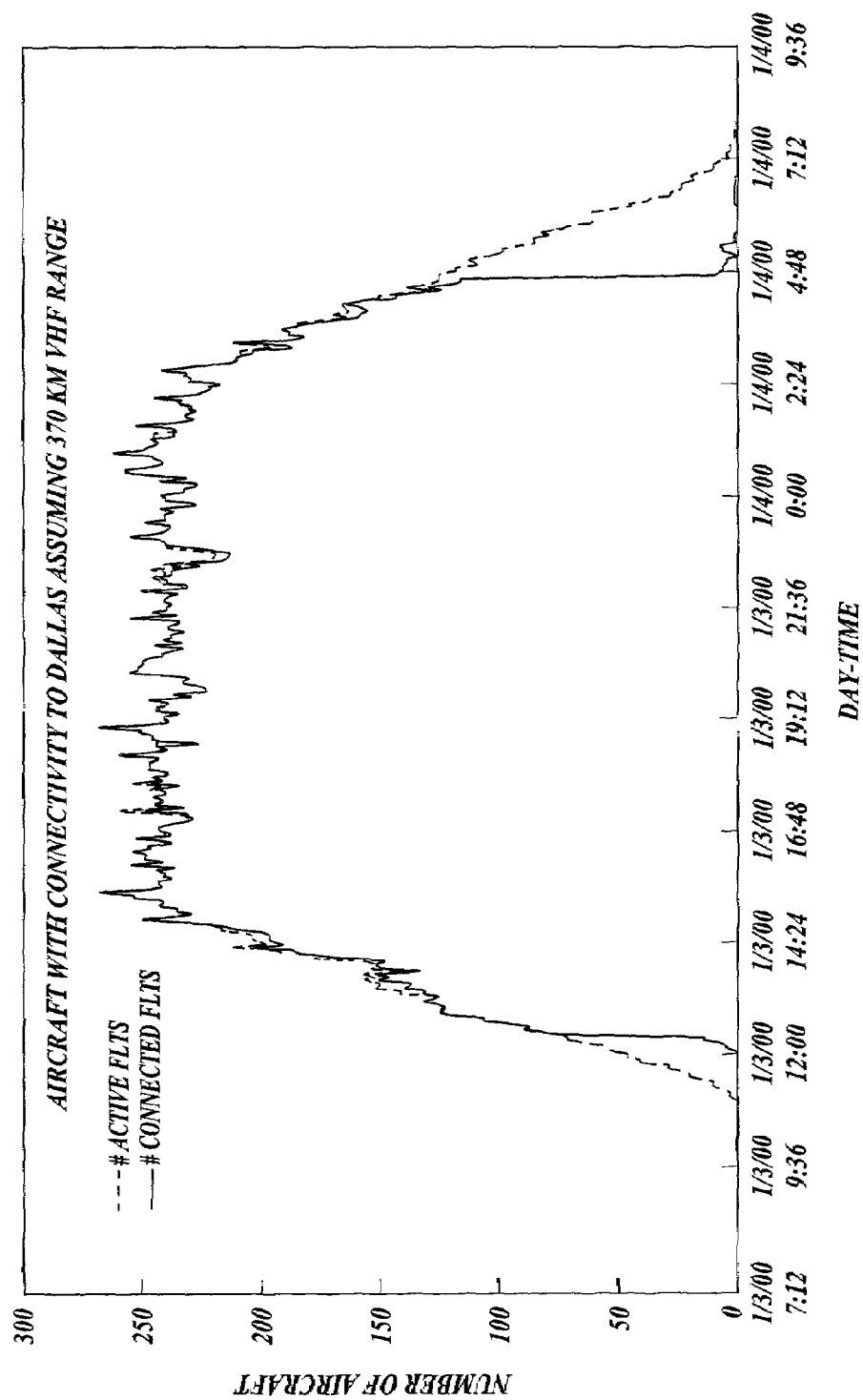
FIG. 1 illustrates data from a U.S. airline showing the total number of aircraft that would have connectivity with Dallas, Tex. through use of the present invention.

For example, FIG. 1 contains data illustrating the number of airborne aircraft from a single airline that can be provided connectivity with Dallas, Tex. using the routing scheme of the present invention. As may be seen from FIG. 1, during most time periods of the day, at least 200 of the airline's airborne aircraft can maintain a connection with Dallas, Tex. by routing their communications traffic through the airline's other airborne aircraft.

By way of illustration, suppose an aircraft overflying Maryland wishes to communicate with Dallas, Tex. Using current communications systems, a downlink to a land based telephone system, SATCOM, or HF communications must be used since Maryland is not within line of sight of Dallas, Tex. Using the present invention, however, the aircraft over Maryland broadcasts, on UHF or VHF, a first message requesting that a communications link be established with Dallas, Tex. Other aircraft within line of sight reception range of the first aircraft receive and process this message and then rebroadcast the message including their own identifying data. The process repeats until the destination user in Dallas receives the request message and replies. In this manner, an ad-hoc network of communications nodes are created from aircraft to aircraft that form a circuit to relay the message from the first aircraft in Maryland to Dallas, Tex.

Figure 2:
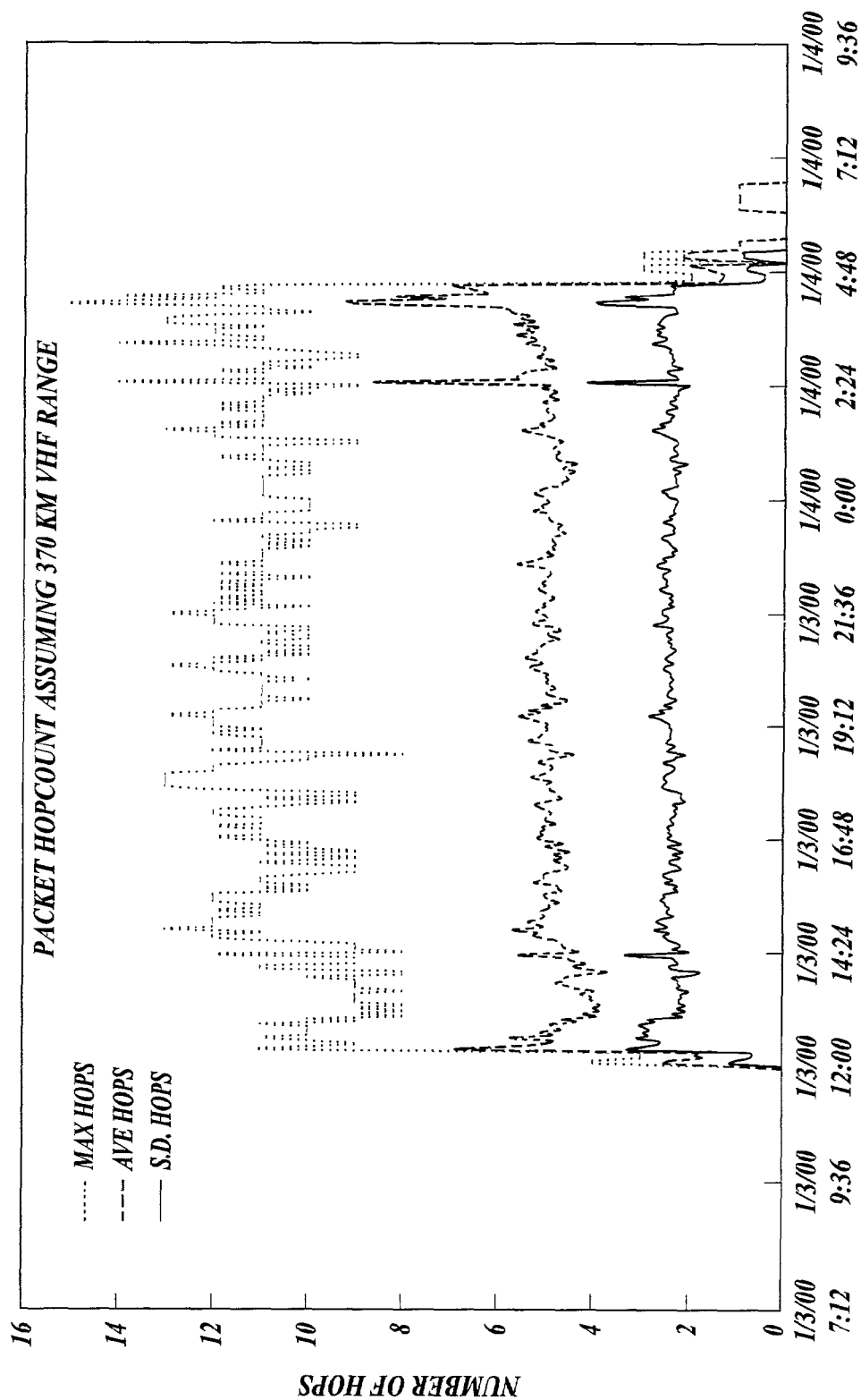
FIG. 2 illustrates the estimated level of packet switching activity between aircraft in a given time period according to a preferred embodiment of the present invention.
Figure 3:
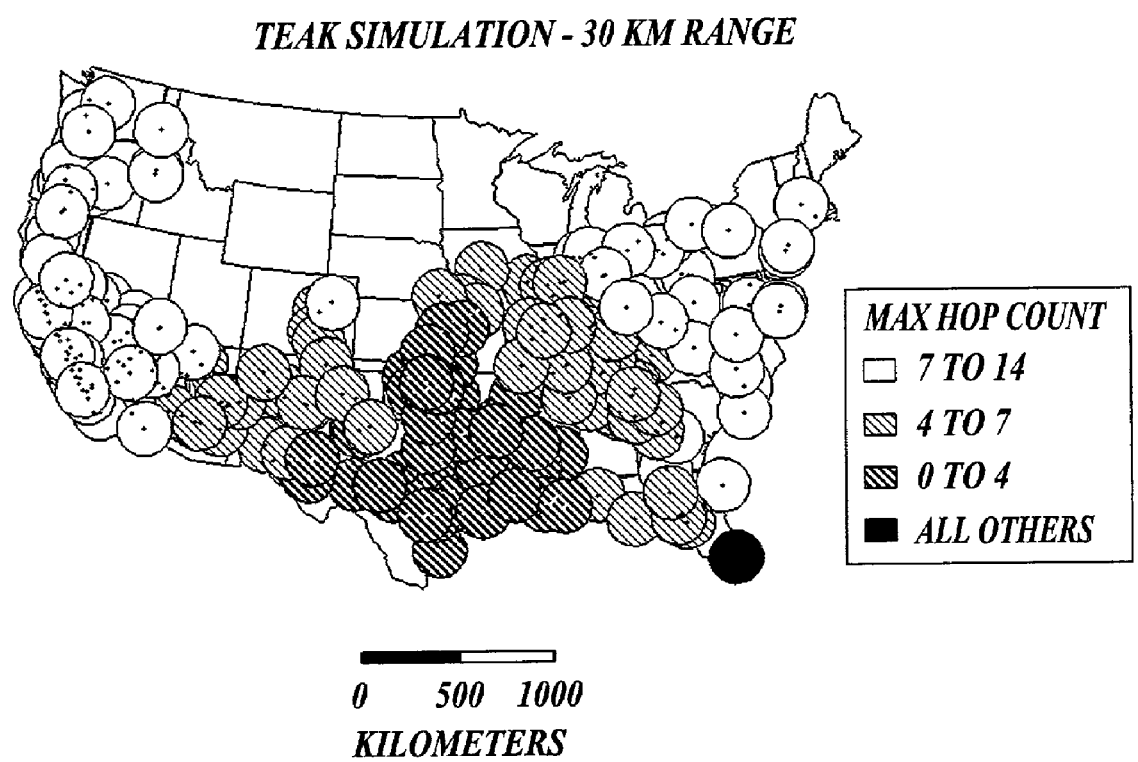
FIG. 3 illustrates the estimated level of packet switching activity relative to the aircraft position in relation to and in VHF communication with Dallas, Tex., according to a preferred embodiment of the invention.

FIG. 2 illustrates the amount of packet switching expected to occur through the airborne aircraft of FIG. 1 given an assumed requirement for communications connectivity with Dallas. FIG. 3 shows the number of circuit nodes through which a message is reasonably expected to pass to supply connectivity with Dallas given origin node location.

The type of messages and bandwidth of the message network system of the present invention is limited only by the transmission link budgets of the various participants. For example, the aviation band currently operates on the 120 MHz band using 25 KHz channels. Using D8PSK modulation, approximately 31 kilobits per second (kps) of bandwidth can be provided for a transmitter operating at 15 watts and a transmission range of 200 miles. Additional bandwidth can be provided by decreasing the transmission range and/or by using spread spectrum communications at higher power.

Additional bandwidth may also be provided by utilizing higher frequencies than those currently licensed for use in the aviation band. Should licenses to such frequencies become available, the bandwidth provided by the present invention can be additionally increased.

Optionally, or in addition to the above techniques, use of processing gain to defeat the noise inherent in the transmitted signal can thereby be used to increase the bandwidth, or the amount of recoverable information in the signal. Processing gain techniques are well known to those of ordinary skill in the art.

Overview of Network Operation

Figure 4:
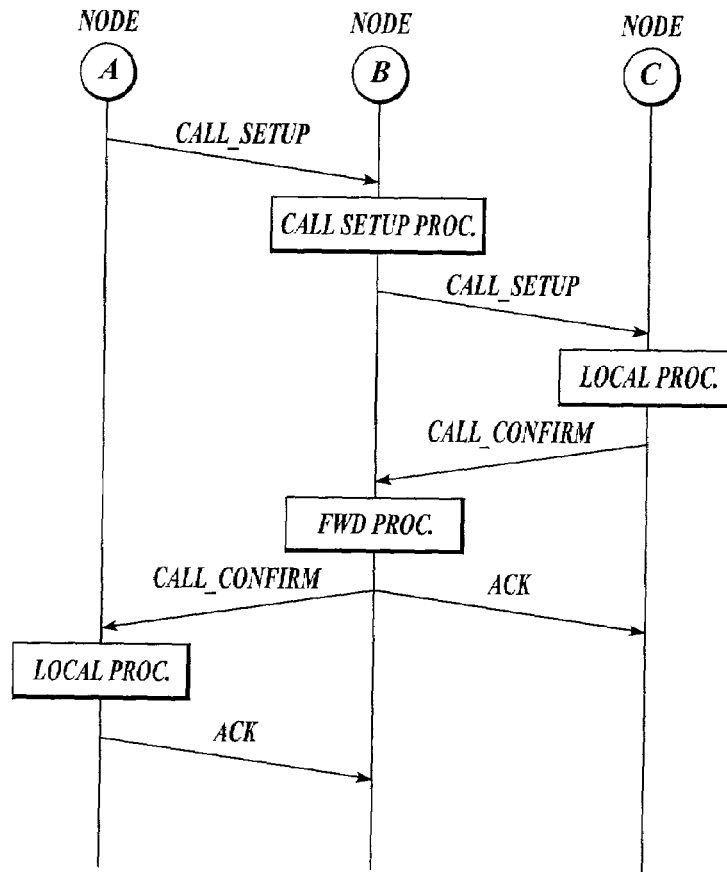
FIG. 4 is a top level message sequence diagram useful for understanding operation of the present invention.

FIGS. 4–7 contain information and flow charts useful for understanding operation of the present invention. FIG. 4 contains a top level flow chart useful for understanding the establishment of an ad hoc circuit for routing a message from a first, source, node A to a second, destination, node C. In the flow chart of FIG. 4, communications node A, which may be a ground station, end user, satellite service provider, airborne aircraft, or other subnetwork node, has a message destined for node C. Like node A, node C may be another airborne aircraft or any other type of subnetwork node.

Figure 5:
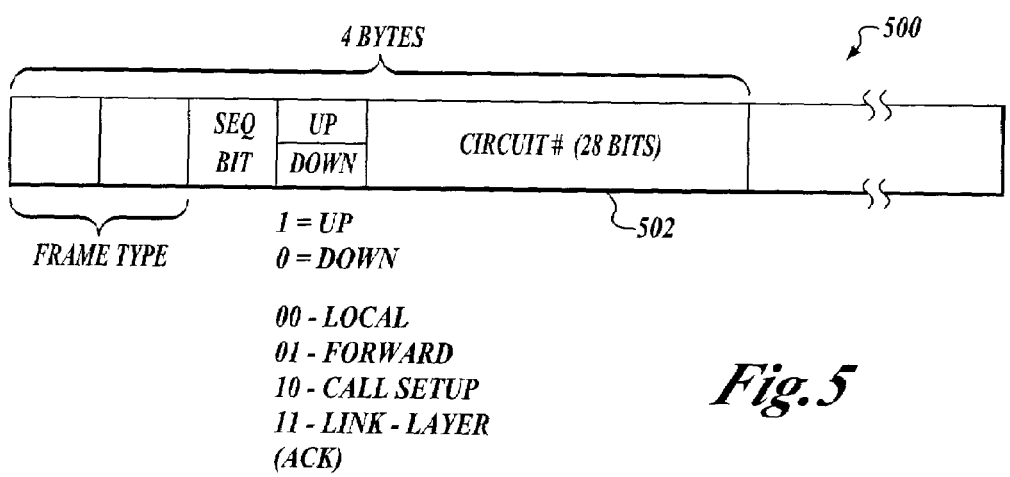
FIG. 5 depicts a frame header for a message format according to an embodiment of the present invention.
Figure 6:
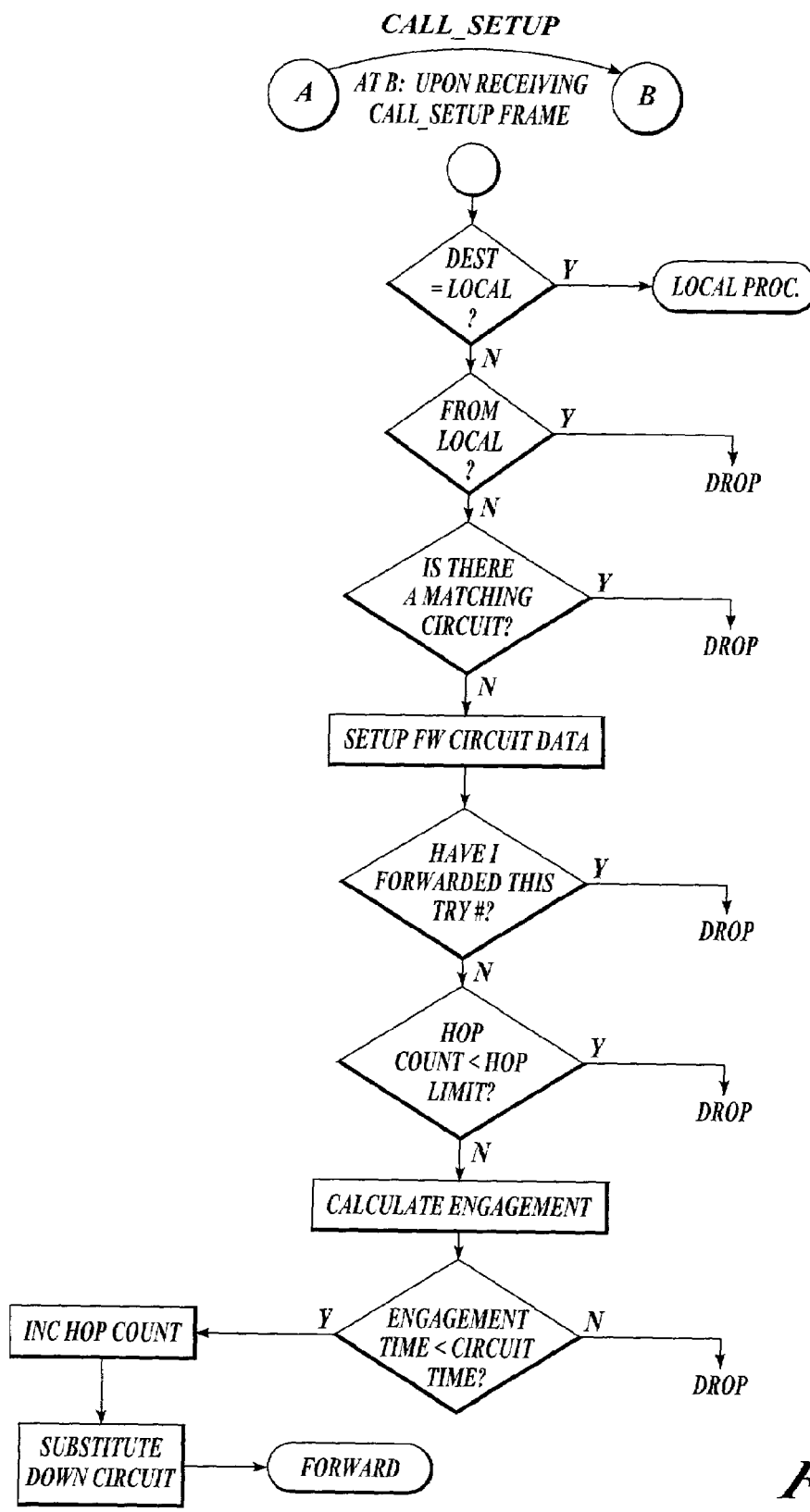
FIG. 6 is a flow chart useful for understanding the processing of messages received at an intermediate node according to an embodiment of the present invention.
Figure 7:
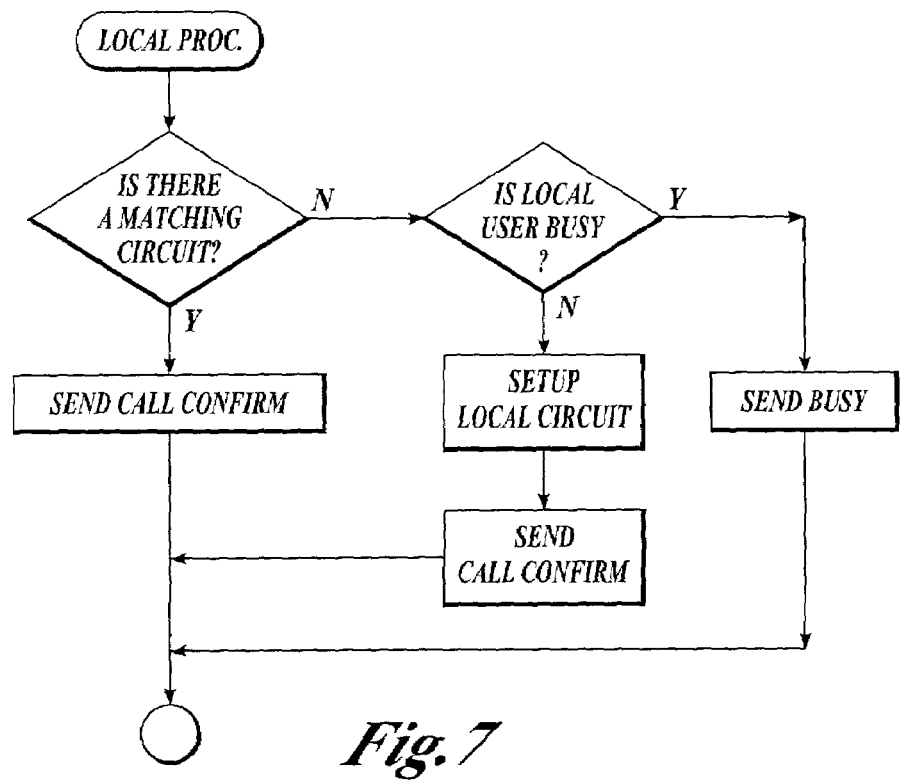
FIG. 7 is a flow chart useful for understanding the processing of messages received at a destination node according to an embodiment of the present invention.

In a preferred embodiment of the invention, the invention transmits and receives messages using label substitution to reduce message frame overhead. Label substitution is well known to those of skill in the art. FIG. 5 shows a message frame 500 having a format suitable for use with the present invention.

According to a preferred embodiment of the invention, to initiate communications, source node A of FIG. 4 transmits a Call_Setup message frame that contains the information outlined in Table I below.

TABLE I

| Call_Setup Frame Contents | |
| --- | --- |
| Source Address | Address of the calling node/aircraft |
| Destination Address | Address of the Aircraft/Node being called |
| Position | Latitude, Longitude, and Altitude of calling Aircraft/Node |
| Trajectory | Kalman filter extrapolation of aircraft motion |
| Required Connect Time | Estimated time needed to transmit the data to be sent |
| Hop Limit | maximum Number of hops to be allowed for the connection |
| Hop Count | 0 on the first transmission |
| Try Number | Count of Call Setup Frames transmitted, initially 1 |
| Down Circuit Number | Unique Circuit Number (label) for local state machine context. |

The Call_Setup frame is transmitted on a VHF or UHF frequency and received by other aircraft within line-of-sight communications range of source node A. Each aircraft that receives the Call_Setup frame transmitted from node A processes the incoming frame as described in the flow chart of FIG. 6.

In the example of FIG. 4, an intermediate node B receives the Call_Setup frame transmitted from node A. Node B determines that the frame is not addressed to Node B, was not transmitted from Node B, and is not a message for which a communications path has been previously established. Node B then sets up a forward circuit context and assigns a forward down circuit number in field 502 of the message. Node B then determines if the message can be retransmitted to a downstream node within the required connect time specified in the Call_Setup frame.

Node B uses the position and trajectory from the Call_Setup frame, and it's own position and trajectory to asses if communications can be maintained with the calling aircraft by extrapolating the positions and trajectories, in a step-wise fashion, over the required connect time period. Co-pending application Ser. No. 09/795,277 provides one method for determining if line of sight communications can be maintained when a terrain database is available. Other methods may be used. If communication can be maintained between the aircraft given the communication link budget and the relative positions of the aircraft during the required time period, then Node B can participate in a connection with node A. Node B then substitutes it's own position, trajectory, and down circuit number in the Call_Setup frame; increments the hop count field of the frame, and retransmits the Call_Setup frame as modified.

Node C receives the Call_Setup frame transmitted by Node B. Node C determines that message destination is local, and performs the processing shown in the flow chart of FIG. 7. Node C then constructs a Call_Confirm frame containing the information in Table II below:

TABLE II

| Call Confirm Frame Contents | |
| --- | --- |
| Circuit Number | Down Circuit Number from Node B's Call Setup frame |
| Up Circuit Number | Circuit Number of the Local Address |
| Total Hop Count | Number of hops from received Call Setup frame |

Node C then transmits the Call_Confirm frame. Any Call_Setup frames with the same source and destination addresses, received by node C from other nodes after node B's frame is received, are ignored. Thus, the first frame to get from Node A to Node C establishes the connection path.

Node B receives the Call_Confirm frame broadcast from Node C and addressed to its down circuit number. Node B then transmits an acknowledgment frame which is received by node C. Node B then substitutes node A's down circuit number in the frame header, and node B's circuit number with the Up bit set for the up circuit number into the Call_Confirm frame, and retransmits the frame.

Node A receives the Call_Confirm frame transmitted from Node B, and the communications circuit is established. Node A sends an acknowledgment frame to Node B. The total hop count in the Call_Confirm can then be used to calculate activity delays for the Local subsystem protocols as is known to those of skill in the art.

Network Node Configuration

Figure 8:
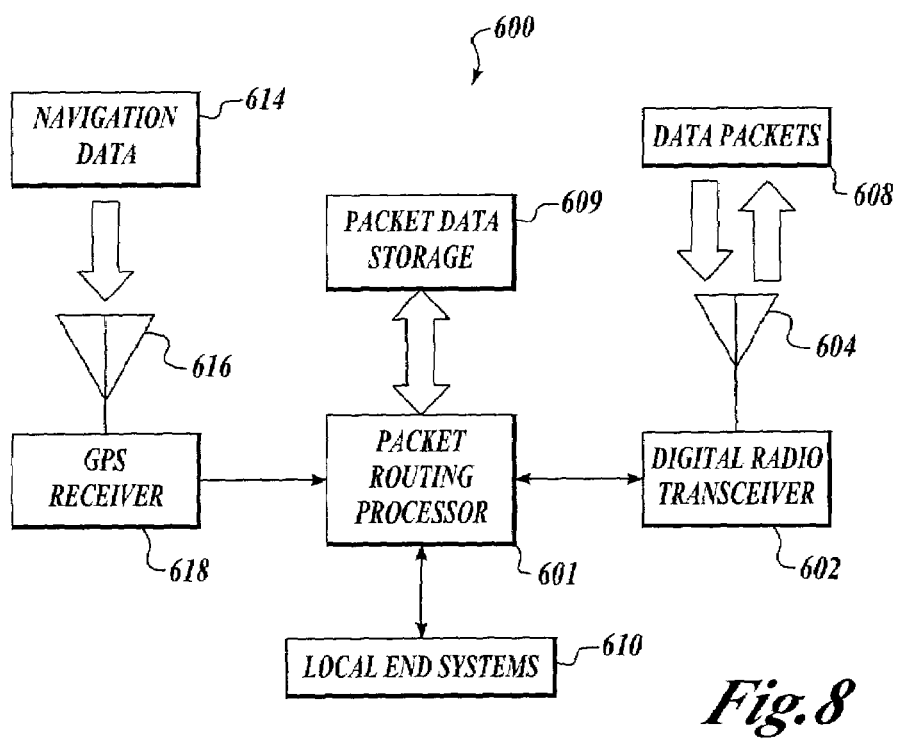
FIG. 8 is a block diagram of a network node configuration according to an embodiment of the present invention.

FIG. 8 shows a block diagram of a network node 600 according to one possible embodiment of the present invention. In the embodiment of FIG. 8, node 600 includes a packet routing processor 601 and a digital radio transceiver, or a discrete receiver and transmitter combination 602 coupled to an antenna 604. When node 600 is located aboard the aircraft, antenna 604 may comprise an omnidirectional antenna mounted on the exterior of the aircraft.

Radio transceiver 602 receives and decodes the data packets 608 received at antenna 604 and inputs them to router 601. When packet processor 601 receives data packet 608, the data packet is then temporarily stored in packet data memory device 609. Memory device 609 may also be used to store messages originating from node 600 for transmission from transceiver 602. Memory device 609 may comprise any form of digital or electronic storage commonly known to those of skill in the art such as, for example, a RAM.

Upon receipt of a data packet 608, processor 601 examines the message frames in accordance with the processes described above in connection with FIGS. 4–7. Router 601 determines if the current node is the destination node, a member of the routing circuit for the received data packet, or is otherwise not part of the routing circuit for that packet. If node 600 is the destination node, routing packet processor 601 routes data packet 608 to the appropriate destination on board system 610. If node 600 forms part of the routing circuit for the message, router 601 processes the message for retransmission in the manner described in connection with FIGS. 4–7 above.

Node 600 also receives navigation information 614. Navigation information, such as, for example, position data and velocity vector data, is utilized by processor 601 for inclusion in messages broadcast or retransmitted from node 600. The navigation data enables node 600 to coordinate with other network nodes to ascertain whether a communications circuit can be maintained with those nodes. In one possible embodiment of the invention, navigation data 614 comprises GPS data received at an on board antenna 616 and processed by a GPS receiver 618. Optionally, navigation data 614 may comprise navigation from other on board navigation systems, such as, for example: DME/DME, LORAN, VOR/DME, inertial navigation systems, OMEGA, ILS, other satellite based navigation systems, terrain database matching, RADAR fixes, or from other available navigation systems in use aboard the aircraft and known to those of skill in the art.

Routing Processor Organization

Figure 9:
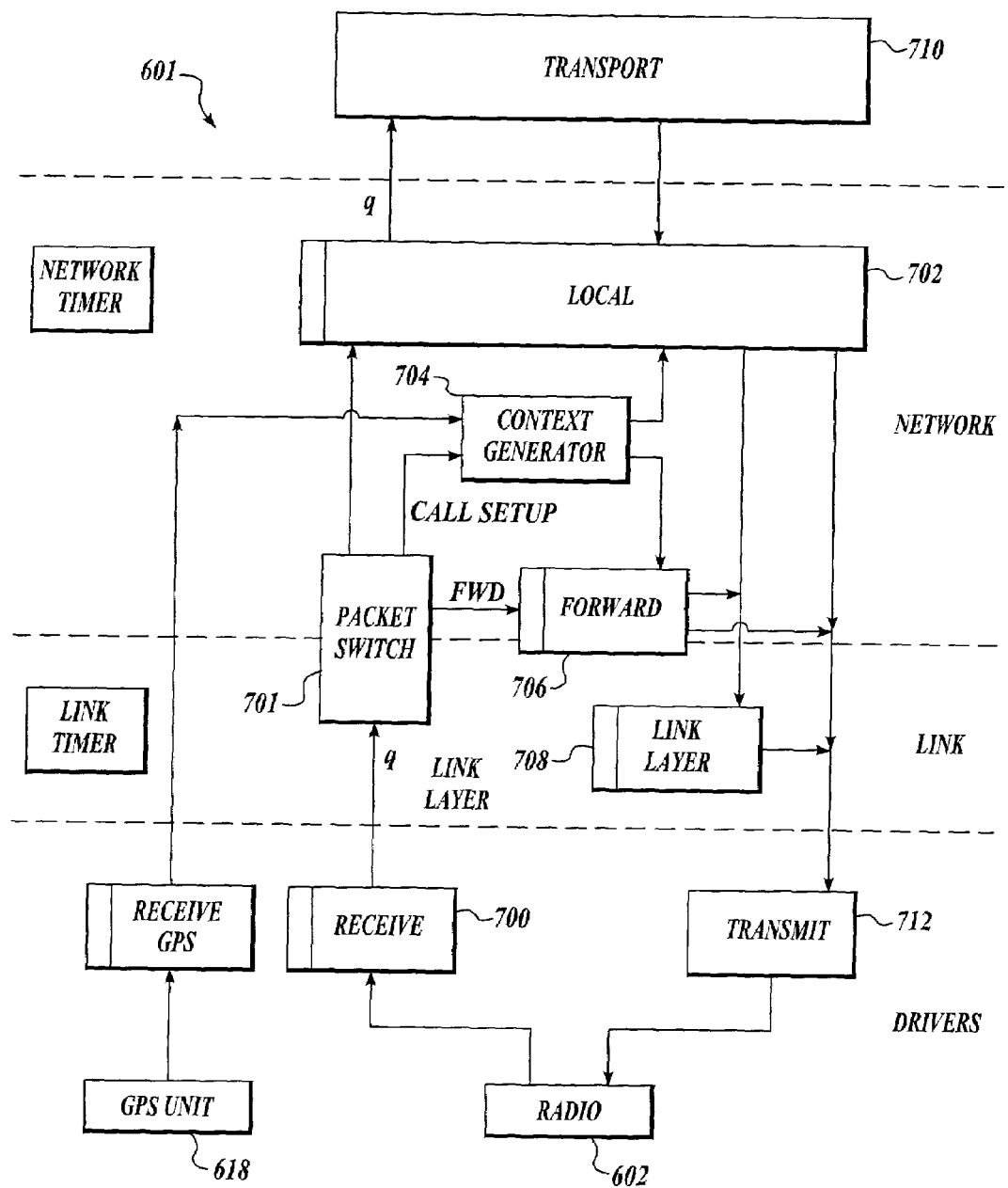
FIG. 9 is a block diagram illustrating the functional organization of a packet routing processor according to an embodiment of the present invention.

FIG. 9 contains a block diagram further detailing the functional organization of packet routing processor 601. The functional organization may be further broken down as shown into a network organizational layer, a link organizational layer and a driver organizational layer. Messages received by radio 602 are first input to a receive subsystem 700, the operation of which is to be described in greater detail below. A packet switch subsystem 701 directs the incoming data to one of a local subsystem 702, a context generator 704, a forward subsystem 706, or a link layer 708; according to the information contained in the data frame header.

When the incoming data packet is a Call_Request frame, packet switch 701 inputs the frame to context generator 704. If the Call_Request frame indicates that node 600 is the destination node, context generator 704 processes the frame to create a new local circuit. If the Call_Request frame indicates that node 600 is other than the destination node, then context generator 704 processes the frame to create a new forward connection circuit and a state machine context to support the link. Once the local or forward circuits have been established, all subsequent messages on that circuit are processed by either the local or forward subsystems as appropriate.

When the incoming data packet is destined for node 600, or an outgoing data packet is originating from node 600, local subsystem 702 provides the protocols that operate on the data being transmitted between the local address/circuit and adjacent nodes. The operation of local subsystem 702 is described in greater detail in the state machine diagram of FIG. 11 to be discussed below. A transport element 710 interfaces with local subsystem 702 to transmit individual data frames to and from the destination end system. Any common transport protocol known to those of skill in the art may be used to implement transport element 710.

The forward subsystem 706 provides the protocols that operate on data routed through local node 600 from and to adjacent network nodes. Link layer 708 and forward subsystem 706 input the frame to be transmitted into a transmit buffer 712 for transmission by radio 602.

Figure 10:
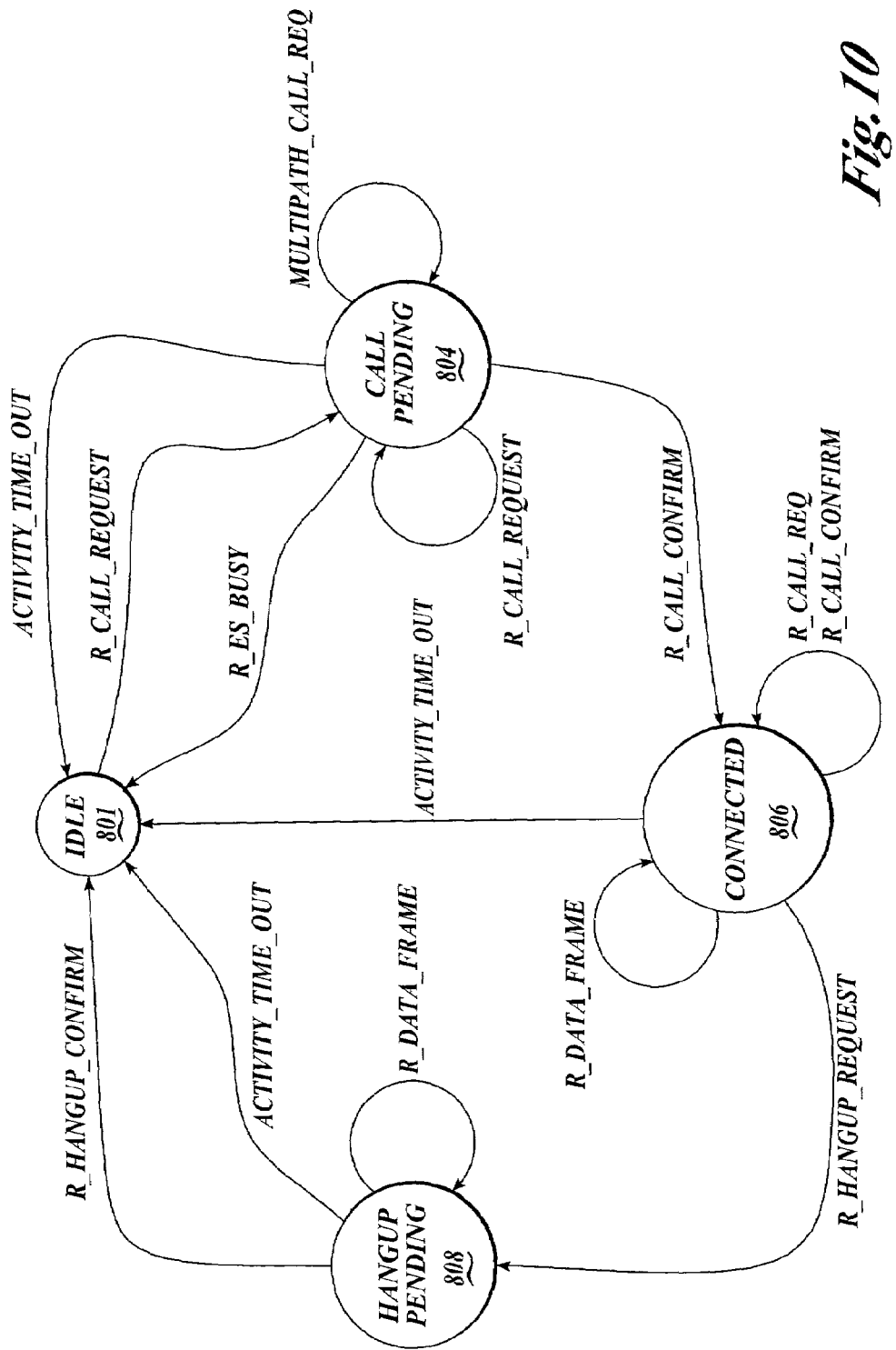
FIG. 10 is a state machine diagram for a forward subsystem of a packet routing processor according to an embodiment of the present invention.
Figure 11:
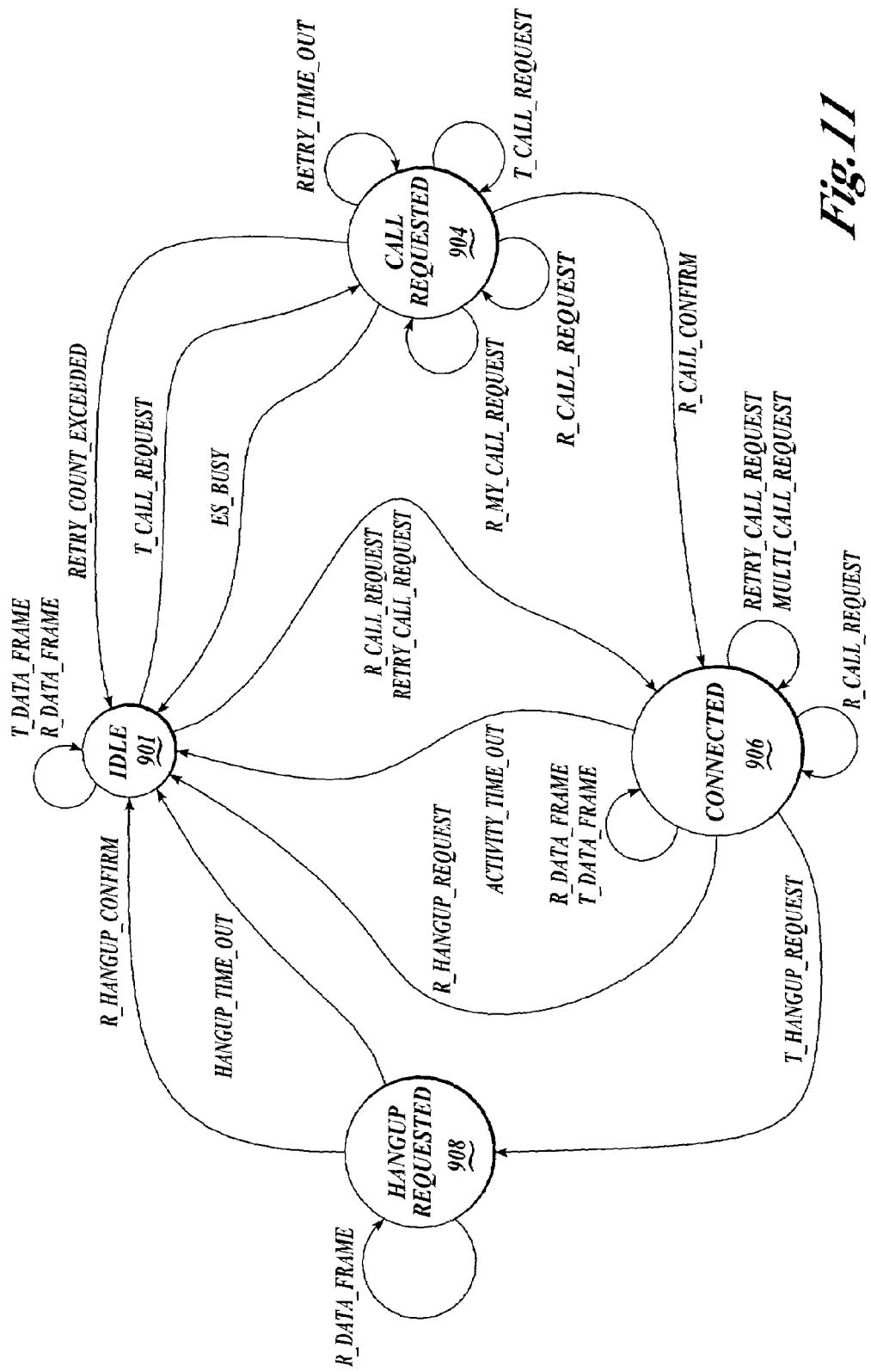
FIG. 11 is a state machine diagram for a local subsystem of a packet routing processor according to an embodiment of the present invention.

The operation of the various subsystems described above can be additionally understood with reference to the state machine diagrams of FIGS. 10 and 11. The state machine diagram of FIG. 10 details operation of forward circuit subsystem 706. In FIG. 10, forward circuit subsystem 706 has a first, or idle state 801. When a Call_Request frame is received, subsystem 706 enters the call pending state 804 in which the request frame is processed. If the current node is busy or otherwise cannot respond within a predetermined time limit, the state machine returns subsystem 706 to idle state 801. Otherwise Call_Request frame is processed in the manner previously described and a R_Call_Confirm message is transmitted. Transmission of the confirmation message causes subsystem 706 to transition from call pending state 804 to the connected state 806.

In connected state 806, forward circuit subsystem 706 conducts those tasks related to the receipt and forwarding of data messages within the established circuit. Receipt of subsequent data frames on the established circuit causes system 706 to remain in connected state 806 until either a hang up request frame is received or an activity time out occurs. An activity time out event returns subsystem 706 to idle state 801. A R-Hangup_Request frame places subsystem 706 into a hang up pending state 808. Additional data frames received on the circuit while in hang up pending state 808 continue to be processed as before until a hang up confirmation is transmitted. Transmission of the hang up confirmation message terminates the current node's participation in the circuit and returns subsystem 706 to idle state 801.

FIG. 11 depicts a state machine diagram that describes the operation of the local subsystem in greater detail. The state machine of local subsystem 702 is similar in organization to that of subsystem 706 in that the machine progress from an idle state 901 through a call request state 904, to a connected state 906 and a hang up state 908. To commence the transmission of a call originating from a local end user subsystem aboard the aircraft, the T_Call_Request message is output which places local subsystem 702 into request state 904. In state 904, local subsystem listens for the establishment of a forward circuit by receipt of a call confirmation message. If no such message is received, the call request message will continue to be sent until a specified number of retry attempts has been exceeded. Exceeding the retry count value returns local subsystem 702 to idle state 901. Receipt of confirmation message will transition local subsystem 702 into the connected state 906.

The connected state 906 can also be entered directly from idle state 901 when a received call (R_Call_Request) request destined for a local end use system is received, or a retry call request is received. In connected state 906, a circuit for relaying messages between the end use subsystem aboard the aircraft and for transmission to/receipt from adjacent nodes has been established. Messages continue to be exchanged using the established circuit until a hang up request message is received, an activity time out occurs or a hang up request is received.

Receipt of the hang up request places local subsystem 702 in hang up state 908. Received data frames continue to be processed in this state until either a hang up confirmation is received or a time out occurs.

Preferred embodiments of the invention have now been described. Variations and modification will be readily apparent to those of ordinary skill in the art. For example, the packet routing processor of the present invention need not be implemented as a state machine but may optionally be implemented as part of a general purpose processor, as executable code, as a digital or analog circuit, or as a programmable logic device. For at least these reasons, the invention is to be interpreted in view of the claims.

What is claimed is:

1. A method for telecommunications comprising:
   receiving a message request from a node at an antenna located aboard an aircraft;
   determining if said message request is destined for said aircraft;
   retransmitting said message request from said aircraft when said message request is destined for another aircraft, wherein said message request includes navigation information of the node;
   predicting a future position of said aircraft;
   predicting a future position of the node based on the received navigation information;
   determining if communications can be maintained with said node over a predefined time interval, wherein the message request includes a unique identifier;
   recording all the nodes the message request has visited; and
   establishing a communication circuit when the message request is determined to reach the node that corresponds to the destination node, the destination node determines that the received message request is the first message request received that has the unique identifier.

2. The method of claim 1, further comprising:
   sending a communication circuit confirmation message from the destination node to the source node after establishment of the communication circuit;
   wherein the sent confirmation message travels to the source node based on the recorded nodes associated with the received message request.

3. The method of claim 2, further comprising:
   sending a message associated the message request from the source node to the destination node based on the confirmation message, wherein the confirmation message includes the recorded nodes of the associated message request used to establish the communication.

4. A telecommunications system comprising:
   a node;
   one or more aircraft, each comprising:
      an antenna for receiving a message request from the node; and
      a processor in data communication with the antenna, the processor comprising:
         a first component for determining if said message request is destined for the aircraft that received the message request;
         a second component for retransmitting said message request when said message request is destined for another aircraft, wherein said message request includes navigation information of the transmitting node;
         a third component for predicting a future position of said aircraft;
         a fourth component for predicting a future position of the node based on the received navigation information;
         a fifth component for determining if communications can be maintained with said node over a predefined time interval, wherein the message request includes a unique identifier;
         a sixth component for recording all the nodes the message request has visited; and
         a component for establishing a communication circuit when the message request is determined to reach the node that corresponds to the destination node, the destination node determines that the received message request is the first message request received that has the unique identifier.

5. The system of claim 4, further comprising:
   a component for sending a communication circuit confirmation message from the destination node to the source node after establishment of the communication circuit,
   wherein the sent confirmation message travels to the source node based on the recorded nodes associated with the received message request.

6. The system of claim 5, further comprising:
   a component for sending a message associated the message request from the source node to the destination node based on the confirmation message,
   wherein the confirmation message includes the recorded nodes of the associated message request used to establish the communication.

* * * * *